United States Patent [19]
Chi

[11] Patent Number: 5,584,123
[45] Date of Patent: Dec. 17, 1996

[54] MOUNTING/CARRYING DEVICE FOR BLADES

[76] Inventor: Chih-Sung Chi, 1F No. 140, Lane 476, Sec. 1 Iong-Ping Road, Tai-Ping Hsiang, Taichung Hsien, Taiwan

[21] Appl. No.: 550,644

[22] Filed: Oct. 31, 1995

[51] Int. Cl.$^6$ .................................................... B26B 1/08
[52] U.S. Cl. .............................. 30/125; 30/162; 30/335
[58] Field of Search ............................. 30/125, 333, 162, 30/336, 340, 86

[56] References Cited

U.S. PATENT DOCUMENTS

| | | | |
|---|---|---|---|
| 5,386,632 | 2/1995 | Schmidt | 30/125 |
| 5,502,896 | 4/1996 | Chen | 30/335 x |

*Primary Examiner*—Douglas D. Watts
*Attorney, Agent, or Firm*—Morton J. Rosenberg; David I. Klein

[57] ABSTRACT

A mounting/carrying device for blades includes a shank having at least one receiving compartment longitudinally extending therethrough for receiving a blade therein and a guiding slot longitudinally extending in one lateral side thereof and communicated with the receiving compartment, a retainer plate provided in the receiving compartment and comprising a groove defined in a first side thereof for receiving a blade end portion of the blade, a fastener element for securely fastening the blade to the retainer plate, and an accommodating compartment having an open end for receiving replacement blades therein. The groove of the retainer plate includes first and second groove sections defined in one side thereof, the first groove section being straight while the second groove section being at an angle with the first groove section.

4 Claims, 5 Drawing Sheets

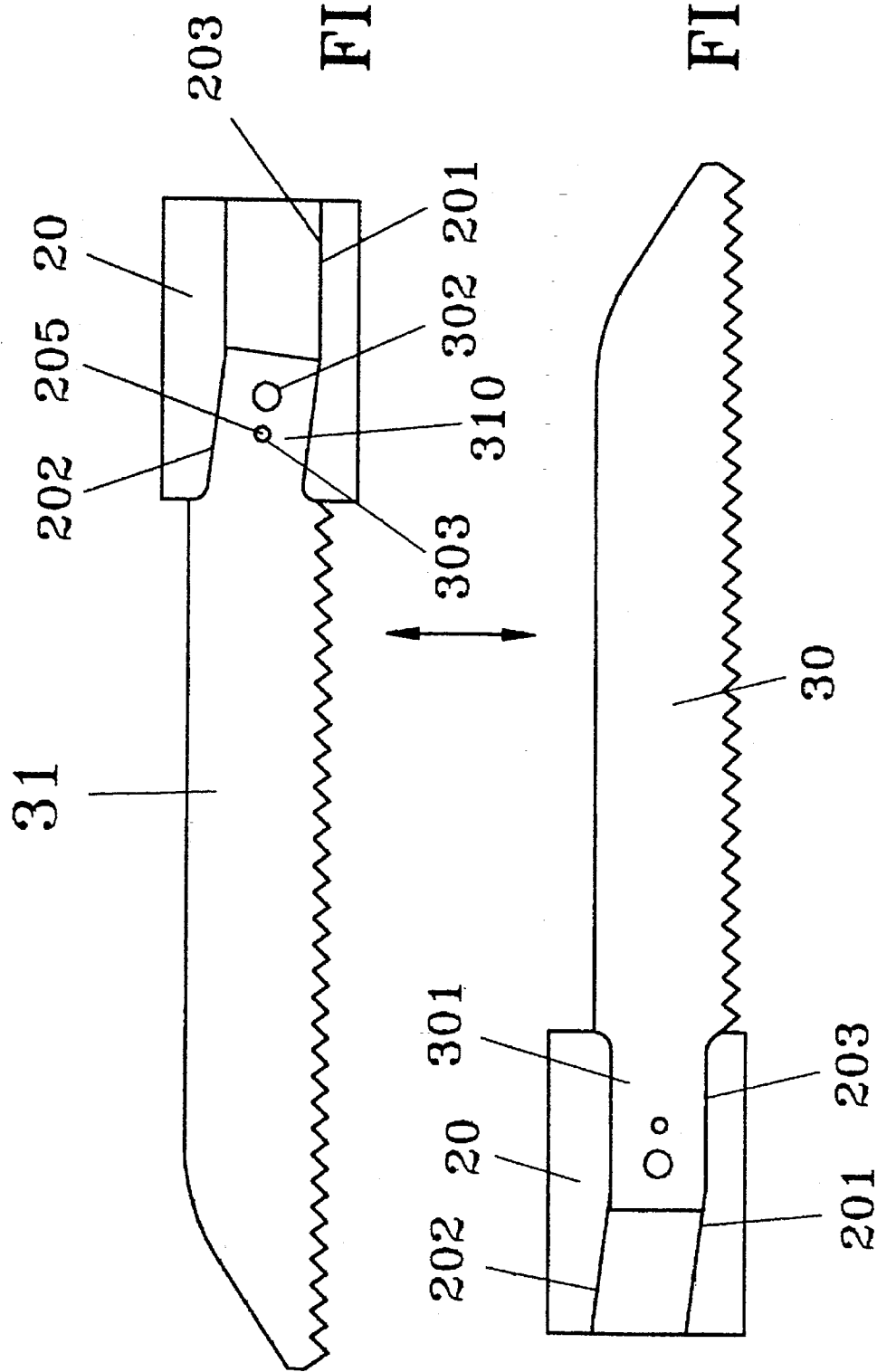

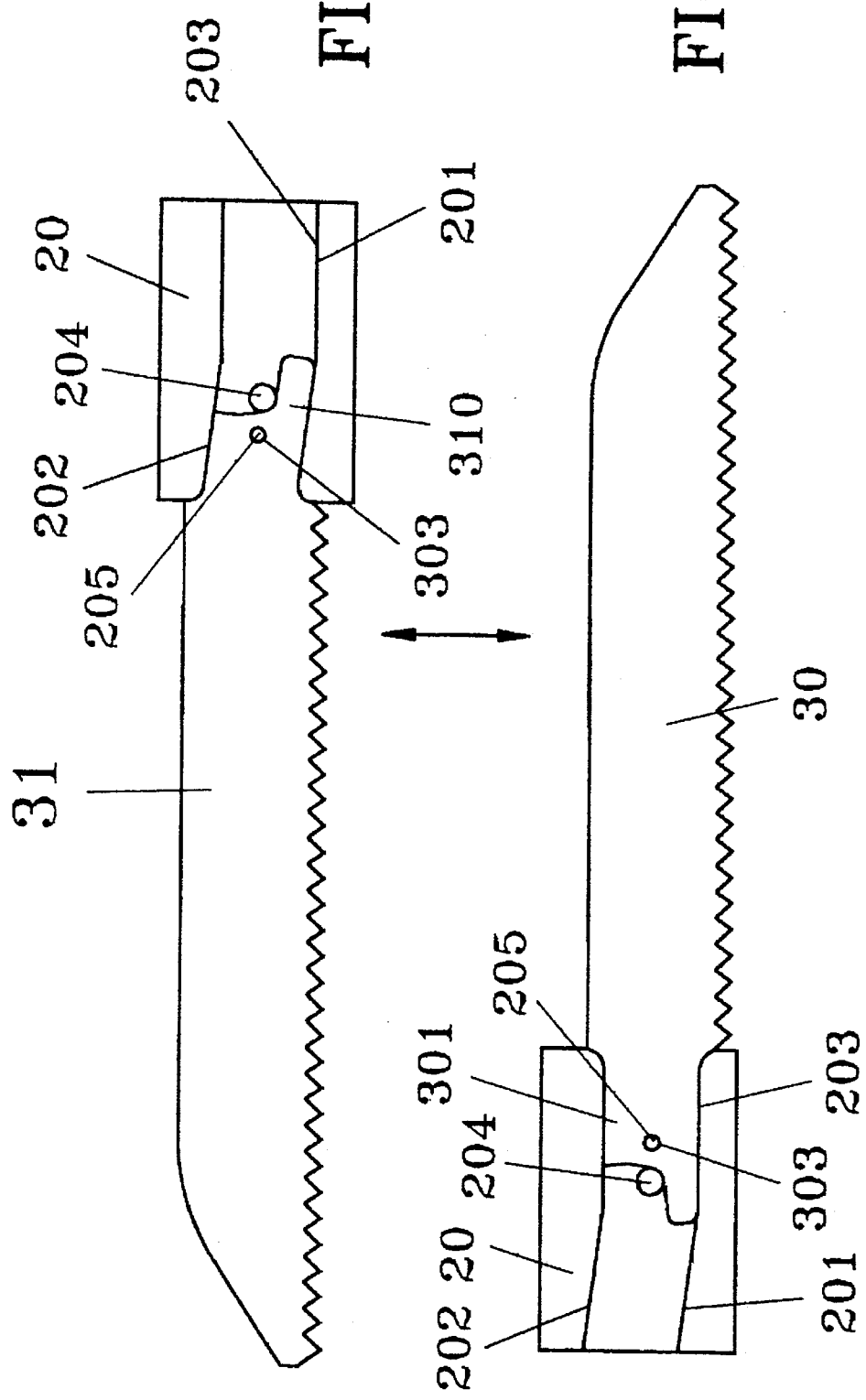

MOUNTING/CARRYING DEVICE FOR BLADES

BACKGROUND OF THE INVENTION

1. Field of the Invention

The present invention relates to a mounting/carrying device for blades, such as saw blades, cutter blades, etc.

2. Description of Related Art

A typical conventional mounting device for blades generally includes a shank having a groove extending longitudinally therethrough for receiving a blade therein and a guiding slot defined in a lateral side thereof and communicated with the groove, a retainer plate mounted in the groove for mounting the blade thereon and having a screw hole therein, and a knob having a threaded stem which extends through the guiding slot and then engages with a screw hole in the blade as well as the screw hole in the retainer plate, thereby fastening the blade. However, it is found that the above-mentioned mounting device still has several disadvantages. Firstly, replacement blades cannot be attached to the mounting device as there is no space for doing so. In other words, if the user forgot to bring replacement blades with him/her, the work must be delayed if the blade cannot be used any more due to abrasion. Furthermore, the replacement blades must be well-packaged before they are put into the tool bag which is usually made of cloth or plastic material, otherwise the sharp ends of the blades are apt to penetrate the tool bag and thus cause injury the human body.

Another disadvantage of the conventional mounting device is that the retainer plate is a planar structure and the blade is merely fastened by the knob and thus tends to bend when cutting or sawing objects, resulting in inconvenience in work.

A further disadvantage of the conventional mounting device is that the shank is straight in contour without any protrusion for secure holding such that, when sawing objects, the hands of the user may slip through not being able to hold the shank tightly, and the user may fall and sometimes might be hurt.

A still further disadvantage of the conventional mounting device is that the guiding slot is open at two ends thereof which results in a weak structure and thus tends to break under action of forces.

Therefore, there has been a long and unfulfilled need for an improved device for blades to mitigate and/or obviate the above-mentioned problems.

SUMMARY OF THE INVENTION

The present invention provides a mounting/carrying device for blades which comprises a shank having at least one receiving compartment longitudinally extending therethrough for receiving a blade therein and a guiding slot longitudinally extending in one lateral side thereof and communicated with the receiving compartment, a retainer plate provided in the receiving compartment and comprising a groove defined in one side thereof for receiving a blade end portion of the blade, a fastener element having an engaging end extending through the guiding slot for securely fastening the blade to the retainer plate, and an accommodating compartment having an open end for receiving replacement blades therein.

In accordance with one aspect of the invention, the shank includes a dovetail construction in one end thereof adjacent to the open end of the accommodating compartment and further comprising an end cap with a complimentary dovetail construction removably mounted to the dovetail construction of the shank to close the accommodating compartment.

In accordance with another aspect of the invention, for receiving blades having different end portions, the groove of the retainer plate includes first and second groove sections defined in said one side thereof, the first groove section being straight and having a transverse hole defined therein, the second groove section being at an angle with the first groove section and having a second transverse hole defined therein.

Preferably, said one side of the retainer plate has two protrusions projecting therefrom and respectively adjacent to the associated transverse holes in the first and second groove sections.

Preferably, the shank includes a protruded portion in one end thereof for easy grasp.

In accordance with a further aspect of the invention, the guiding slot does not extend beyond the shank, thereby providing a strong structure.

Other objects, advantages, and novel features of the invention will become more apparent from the following detailed description when taken in conjunction with the accompanying drawings.

BRIEF DESCRIPTION OF THE DRAWINGS

FIG. 4A illustrates a blade having a straight blade end portion;

FIG. 4B illustrates a blade having a blade end portion which is at an angle with the main blade portion;

FIG. 5A illustrates a blade having a straight blade end portion with a cutout; and FIG. 5B illustrates a blade having a blade end portion which is at an angle with the main blade portion and has a cutout.

DESCRIPTION OF THE PREFERRED EMBOBIMENTS

Figure 1:
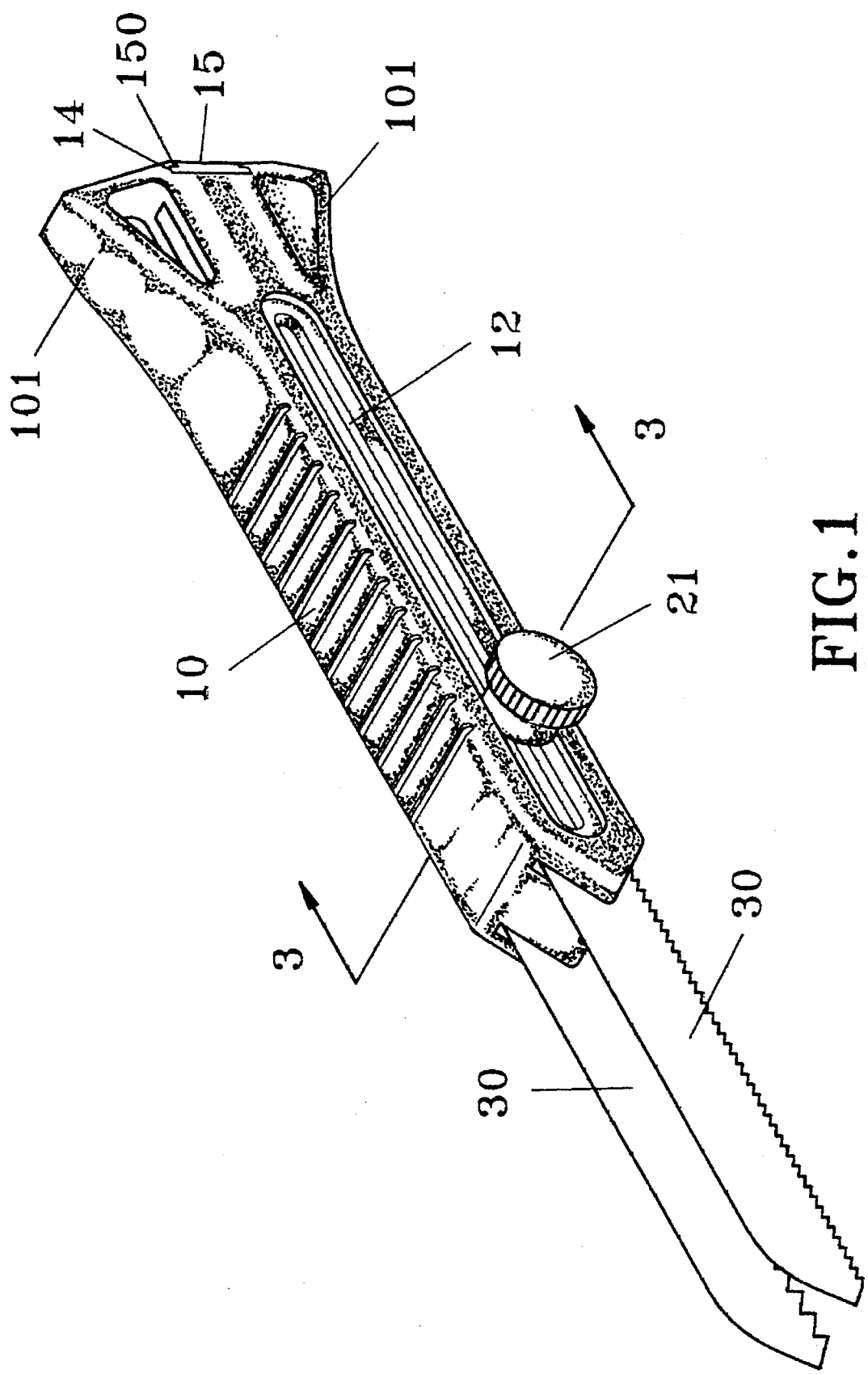
FIG. 1 is a perspective view of a mounting/carrying device for blades in accordance with the present invention.
Figure 2:
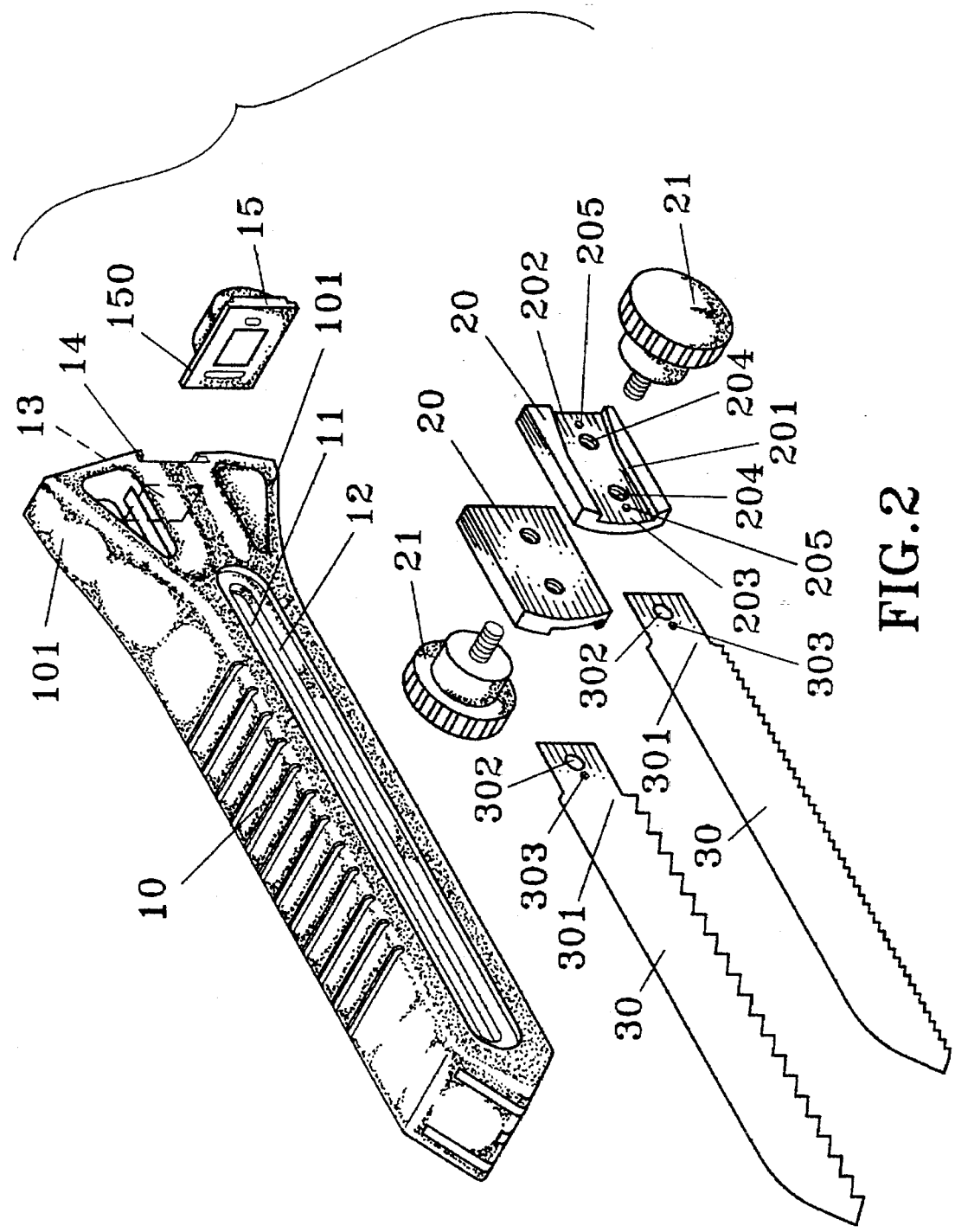
FIG. 2 is an exploded view of the mounting/carrying device in accordance with the present invention.
Figure 3:
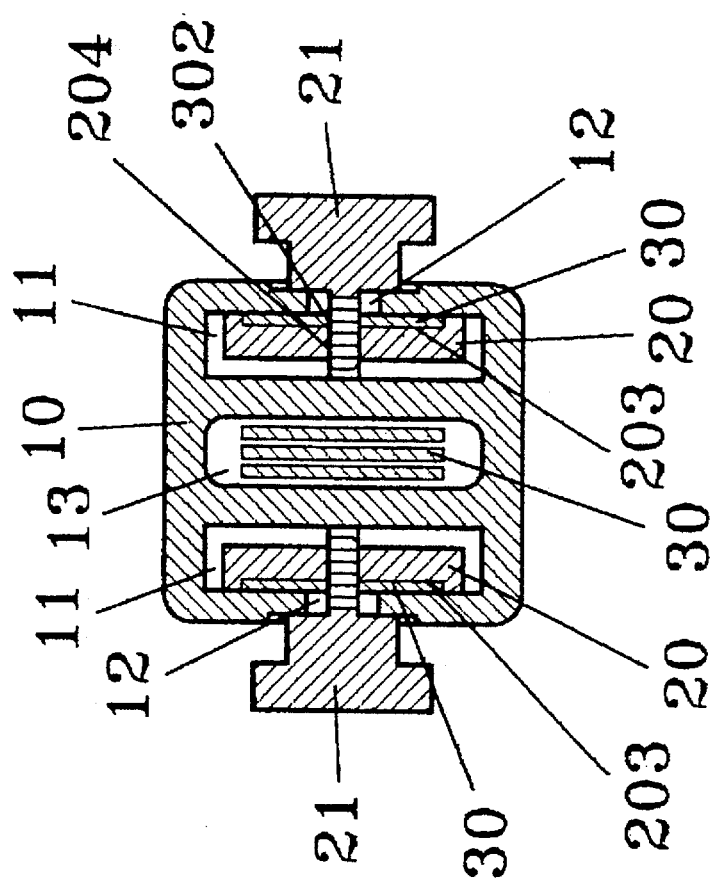
FIG. 3 is a cross-sectional view taken along line 3—3 in FIG. 1.

Referring to the drawings and initially to FIGS. 1 through 3, a mounting/carrying device in accordance with the present invention generally includes a shank 10 having first and second ends, two receiving compartments 11 (see FIG. 3) longitudinally extending therethrough each for receiving a blade 30 therein and a pair of guiding slots 12 respectively longitudinally extending in two lateral sides thereof, each guiding slot 12 having an appropriate length and communicating with the associated receiving compartments 11. Preferably, the shank 10 includes at least one protruded portion 101 in the first end thereof for easy grasp.

A retainer plate 20 is provided in each receiving compartment 11 and includes a groove 201 defined in a first side thereof, the groove 201 having first and second groove sections 203 and 202. As clearly shown in FIG. 2, the first groove section 203 is straight and has a transverse hole 204 defined therein and a protrusion 205 projecting from the first side of the retainer plate 20, while the second groove section 202 is at an angle with the first groove section 203 and also has a transverse hole 204 defined therein and a protrusion 205 projecting from the first side of the retainer plate 20. A fastener element, such as a knob 21 with an engaging end (a threaded stem, not labeled), is provided to securely fasten the blade 30 to the associated retainer plate 20. This is achieved by extending the threaded stem through the guiding slot 11 to engage with the transverse hole 204 in the retainer plate 20 and a hole 302 in the blade 30, yet allowing longitudinal sliding movements of the blade 30 and the retainer plate 20 in the associated receiving compartment 11 upon slight loosening of the knob, which is conventional and therefore is not further described.

Referring to FIGS. 2 and 3, the shank 10 further includes an accommodating compartment 13 having an open end for receiving replacement blades 30 therein. Preferably, the shank 10 includes a dovetail construction 14 in the first end thereof adjacent to the open end of the accommodating compartment 13 and an end cap 15 with a complimentary dovetail construction 150 is removably mounted to the dovetail construction of the shank 10 to close the accommodating compartment 13.

If a blade 30 has a straight blade end portion 301 (see FIGS. 2 and 3) having a transverse hole 302 for engagement with the retainer plate 20, the straight blade end portion is received in the straight first groove section 203. Preferably, the blade end portion may include a further transverse hole 303 and the retainer plate 20 includes a protuberance 303 extending from a first side thereof for engagement with the transverse hole 303, thereby providing further secure fastening.

FIG. 4A illustrates a blade 30 having a straight blade end portion 301 which can thus be fittingly received in the straight first groove section 203 of the groove 201 of the retainer plate 20. FIG. 4B illustrates a blade 31 having a blade end portion 310 which is at an angle with the main blade portion (not labeled), and which can thus be fittingly received in the second groove section 202 of the groove 201 of the retainer plate 20.

FIG. 5A illustrates a blade 30 having a straight blade end portion 301 which can thus be fittingly received in the straight first groove section 203 of the groove 201 of the retainer plate 20. The blade end portion 301 further has a cutout (not labeled), such cutout having a transition section with a curvature corresponding to that of the screw hole 204 such that the knob 21, after engagement with the screw hole 204, is urged tightly against the transition section of the cutout, thereby providing a secure fastening effect.

FIG. 5B illustrates a blade 31 having a blade end portion 310 which is at an angle with the main blade portion (not labeled), which can thus be fittingly received in the second groove section 202 of the groove 201 of the retainer plate 20. Similarly, the straight blade end portion 301 has a cutout (not labeled), such cutout having a transition section with a curvature corresponding to that of the screw hole 204 such that the knob 21, after engagement with the screw hole 204, is urged tightly against the transition section of the cutout, thereby providing a secure fastening effect.

According to the above description, it is appreciated that the present invention has the following advantages:

(1) the replacement blades can be directly lodged in the accommodating compartment 13 and thus eliminates corresponding problems encountered by prior art carrying devices;

(2) a wide variety of blades can be selectively coupled to the present mounting/carrying device as the retainer plates have different groove sections;

(3) the shank 10 includes protruded portions 101 to be easily grasped by a user, thereby preventing from slipping of the shank in the hand of the user; and (4) unlike the conventional designs, the guiding slots 12 do not extend beyond the shank 10, thereby providing a strong structure to prevent from bending during work.

Although the invention has been explained in relation to its preferred embodiment, it is to be understood that many other possible modifications and variations can be made without departing from the spirit and scope of the invention as hereinafter claimed.

What is claimed is:

1. A mounting/carrying device for blades, comprising:

a shank having at least one receiving compartment longitudinally extending therethrough for receiving a blade therein and a guiding slot longitudinally extending in a lateral side thereof and communicated with the receiving compartment;

a retainer plate provided in the receiving compartment and comprising a groove defined in a first side thereof for receiving an end portion of the blade, said groove of said retainer plate including first and second groove sections, said first groove section being straight and having a transverse hole formed therein, said second groove section being angularly offset with respect to said first groove section and having a second transverse hole formed therein;

a fastener element having an engaging end extending through the guiding slot for securely fastening the blade to the retainer plates; and an accommodating compartment having an open end for receiving replacement blades therein.

2. The device as claimed in claim 1, wherein the shank includes a dovetail construction in one end thereof adjacent to the open end of the accommodating compartment and further comprising an end cap with a complimentary dovetail construction removably mounted to the dovetail construction of the shank to close the accommodating compartment.

3. The device as claimed in claim 1, wherein said one side of the retainer plate has two protrusions projecting therefrom and respectively adjacent to the associated transverse holes in the first and second groove sections.

4. The device as claimed in claim 1, wherein the shank includes a plurality of protruded portions in one end thereof for a user to grasp said shank easily.

* * * * *